US006329992B1

(12) United States Patent
Schallig

(10) Patent No.: US 6,329,992 B1
(45) Date of Patent: Dec. 11, 2001

(54) METHOD FOR MULTILEVEL GENERATION OF A GRANULAR GRAPHIC PATTERN, A MACHINE FOR APPLYING SUCH PATTERN TO A PRODUCT, A PRIMARY PRODUCT SO MANUFACTURED, AND A SECONDARY PRODUCT MANUFACTURED BY COPYING SUCH PRIMARY PRODUCT

(75) Inventor: Michiel A. A. Schallig, Drachten (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/370,780

(22) Filed: Nov. 5, 1998

(51) Int. Cl.[7] .................................................. G06T 11/20
(52) U.S. Cl. ............................................................ 345/441
(58) Field of Search ................................... 345/425, 429, 345/430, 433, 436–439, 441; 382/302, 304, 308

(56) References Cited

U.S. PATENT DOCUMENTS 5,060,169  10/1991  Khosla ................................. 364/521

*Primary Examiner*—Almis R. Jankus
*Assistant Examiner*—G. F. Cunningham
(74) *Attorney, Agent, or Firm*—Ernestine C. Bartlett; Norman N. Spain

(57) ABSTRACT

Generation of a granular graphic pattern on a physical surface is based on the multiple usage of elementary shapes. In particular, the method uses computer graphics in a multilevel pattern generation. It features defining at least two different absolute and/or relative transformation specifiers that are non-uniform amongst the elementary shapes with respect to either neighbouring ones of said elementary shapes and/or with respect to an overall geometry of the elementary shape in question. Finally, it applies the elementary shapes so specified on the physical surface.

17 Claims, 7 Drawing Sheets

METHOD FOR MULTILEVEL GENERATION OF A GRANULAR GRAPHIC PATTERN, A MACHINE FOR APPLYING SUCH PATTERN TO A PRODUCT, A PRIMARY PRODUCT SO MANUFACTURED, AND A SECONDARY PRODUCT MANUFACTURED BY COPYING SUCH PRIMARY PRODUCT

BACKGROUND TO THE INVENTION

The invention relates to a method for generating a granular graphic pattern on a physical surface, based on the multiple usage of elementary shapes. Such granular patterns have in the form of structures and/or textures found application for producing many articles of manufacture. The effect of such patterns may lie only on the level of outward appearance of the final product, such as in dulling an otherwise gleaming surface, or for attaining outright embellishment. Other usage of such procedure is to render small future surface damages more or less invisible, to render the surface less slippery, or to indicate various surface parts as representing a particular functionality, such as a preferred grip area for human hands. The pattern may be applied to a primary product that is subsequently used for copying on secondary products, such as through chemical, physical or mechanical processes that by themselves have been in wide use in manufacturing.

If the size of the granularity is by itself sufficient to be recognized by a human person, the pattern is called a structure. If the size is smaller but still sufficient as to cause some visual effect, it is called a texture. The physically applying of the pattern to the product may be done by one of various known procedures, such as for example by laser writing, although general procedures of such applying have been known for long.

The inventor has recognized the need for improving the generating of the pattern itself, as defined in one or more of the following aspects, and in particular the application of randomization in such generating, as follows:

a. the pattern itself must be repeatedly reproducible,
b. the granularity should be scalable for use as texture,
c. the pattern should not cause uncontrollable and unwanted large-scale irregularities,
d. the pattern should allow using various different types of elementary shapes,
e. the basic generation parameters should be modifiable.

SUMMARY TO THE INVENTION

Now therefore, amongst other things, it is an object of the present invention to provide a method for generating such patterns according to the preamble that can be rendered non-uniform in a carefully controllable and reproducible manner. In consequence, according to one aspect of the invention a method is provided for generating a granular graphic pattern on a physical surface based on the multiple usage of elementary shapes. According to the invent ion, this method defines at least two different transformation specifiers. Through introducing the non-uniformity on the basis of at least two independent parameters, the variability of the result is large, while the description and the manipulation of the parameters become an easy task. The non-uniformity can be described in terms of one or more specifiers that indicate the non-uniformity directly or indirectly. It has been found that the procedure can also realize superstructures in the pattern in a nicely controllable manner.

By itself, U.S. Pat. No. 5,060,169 describes the producing of a simulated airbrush spray pattern comprising a random pattern of pixels in a video image, through creating multiple source arrays defining random variations of one or more video image parameters. The arrays are varied on a regular basis to create a random pattern in the image that simulates the effects of an airbrush spray. The present invention, through the usage of the elementary shapes, is more useful to generate the surface of a 3-D product, and offers a wider variability in attainable effects.

Advantageously, a shape transformation specifier and a location transformation specifier are subjected in parallel to various non-uniformizations for subsequent aggregation of the latter. This renders the two variations even more independent, so that the setting of required variability becomes a still easier task. In particular for realizing large-scale effects, the position and the actual shape can be decoupled from each other.

Advantageously, an actual location parameter value of an elementary shape before applying the location transformation specifier is retrocoupled for controlling non-uniformization of the shape transformation specifier. In this manner, the influencing of the individual elementary shapes is rendered straightforward, which facilitates the managing.

Advantageously, at least a part of said non-uniform specifiers are randomizing. As an alternative to deterministic non-uniformization, randomizing has been found a particularly effective mechanism for realizing all kinds of effects. This may bring about improved perception of the product and of its functionality. Alternatively, the effect may be subjective only. The manner of introducing the randomization maintains its reproducibility amongst successive products.

The invention also relates to a machine for applying such granular graphic pattern to a product, and to a primary product so manufactured. Particular examples of such products relate to domestic appliances and devices used for personal care, such as, for example, shavers. The invention also relates to a secondary product manufactured by copying such primary product. Further advantageous aspects of the invention are recited in dependent Claims.

BRIEF DESCRIPTION OF THE DRAWING

These and other aspects and advantages of the invention will be discussed hereinafter with reference to the disclosure of preferred embodiments, and in particular with reference to the appended Figures that show.

DETAILED DISCLOSURE OF PREFERRED EMBODIMENTS

Figure 1:
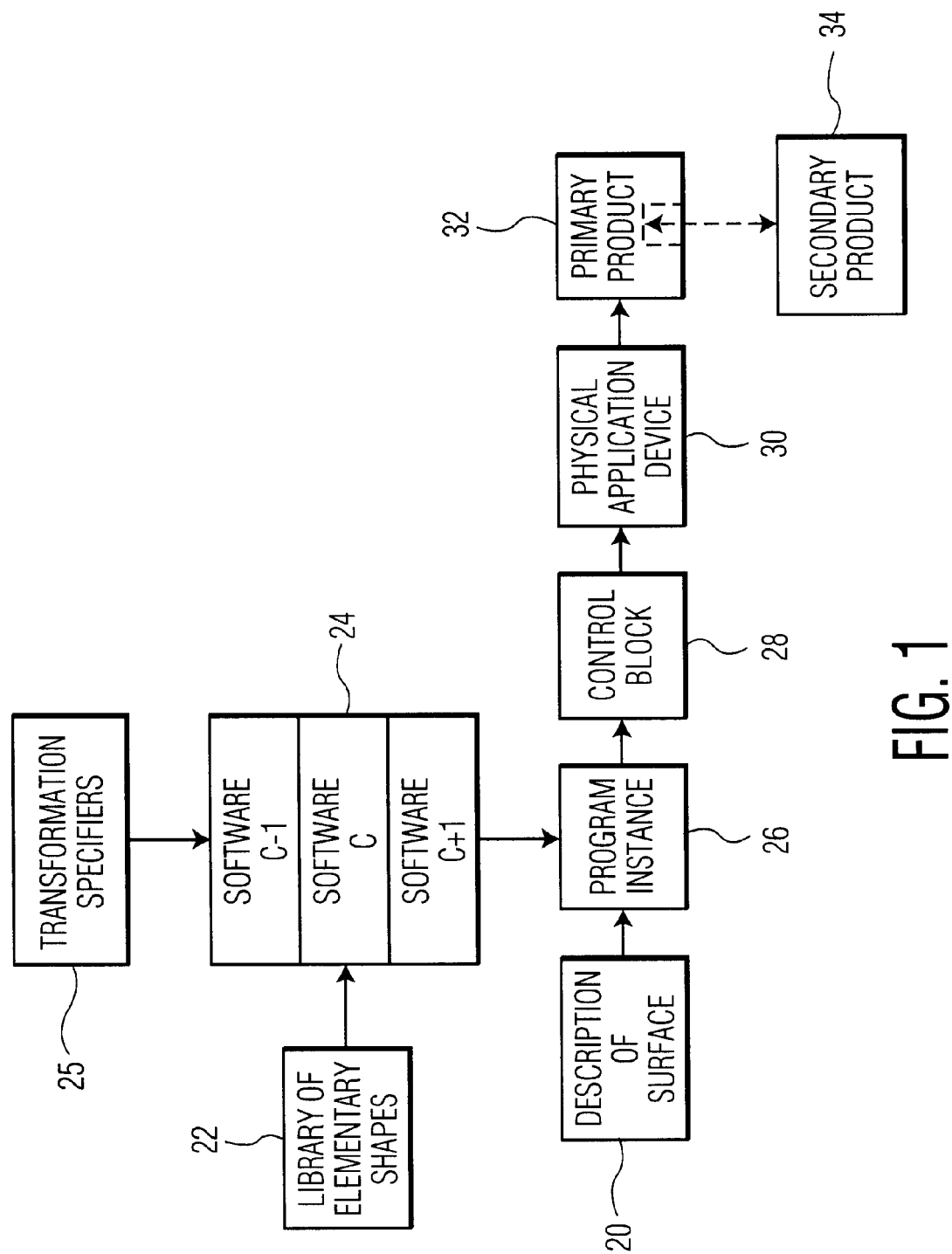
FIG. 1, a block diagram of a pattern-forming machine.

FIG. 1 is a block diagram of a pattern-forming machine. Therein, block 20 represents a description of the surface of the primary product that should receive the ultimate pattern, inclusive of describing such spatial tolerances as necessary. For example, the applying of the pattern may imply the adding or removing, as the case may be, of a relatively thin surface layer. Block 22 contains a library of elementary shapes in standard form. Block 24 contains the layered software package that allows the generating of the eventual program instance. In block 26, through receiving of the various specifier values on input 25, the basic software package, and the surface description, the actual program instance is developed. In block 28, this program is applied as control program to a physical application device 30, such as a laser, sputtering machine, or the like. Through the invention, such apparatus will then broadly operate as a platter on a surface that is defined in two or three dimensions. The application device 30 gets its instructions from the control block 28, for applying the pattern proper to primary product 32. If this product is intended for copying on a secondary product 34, after finishing of the primary product, the secondary product is temporally aligned with primary product 32, to accommodate the copying of its surface to the shapes now present of the surface of primary product 32. Such copying can be moulding, casting, spark erosion, or any of various other procedures. Subsequently, the secondary product is removed for technical or economic usage. If required, additional intermediate steps may be used in the manufacturing.

For brevity, technological details of the (electro)physical, (electro)chemical or mechanical applying or copying are ignored, inasmuch as they are widely available to the skilled art person. Also, the actual choice theramongst is governed by the number of copies required in first or second instance, the substrate material, the required geometrical granularity, and various other manufacturing parameters. The program may be realized by writing in the well known C++ computer language that through its object oriented character is very suited for this type of programming.

Figure 2:
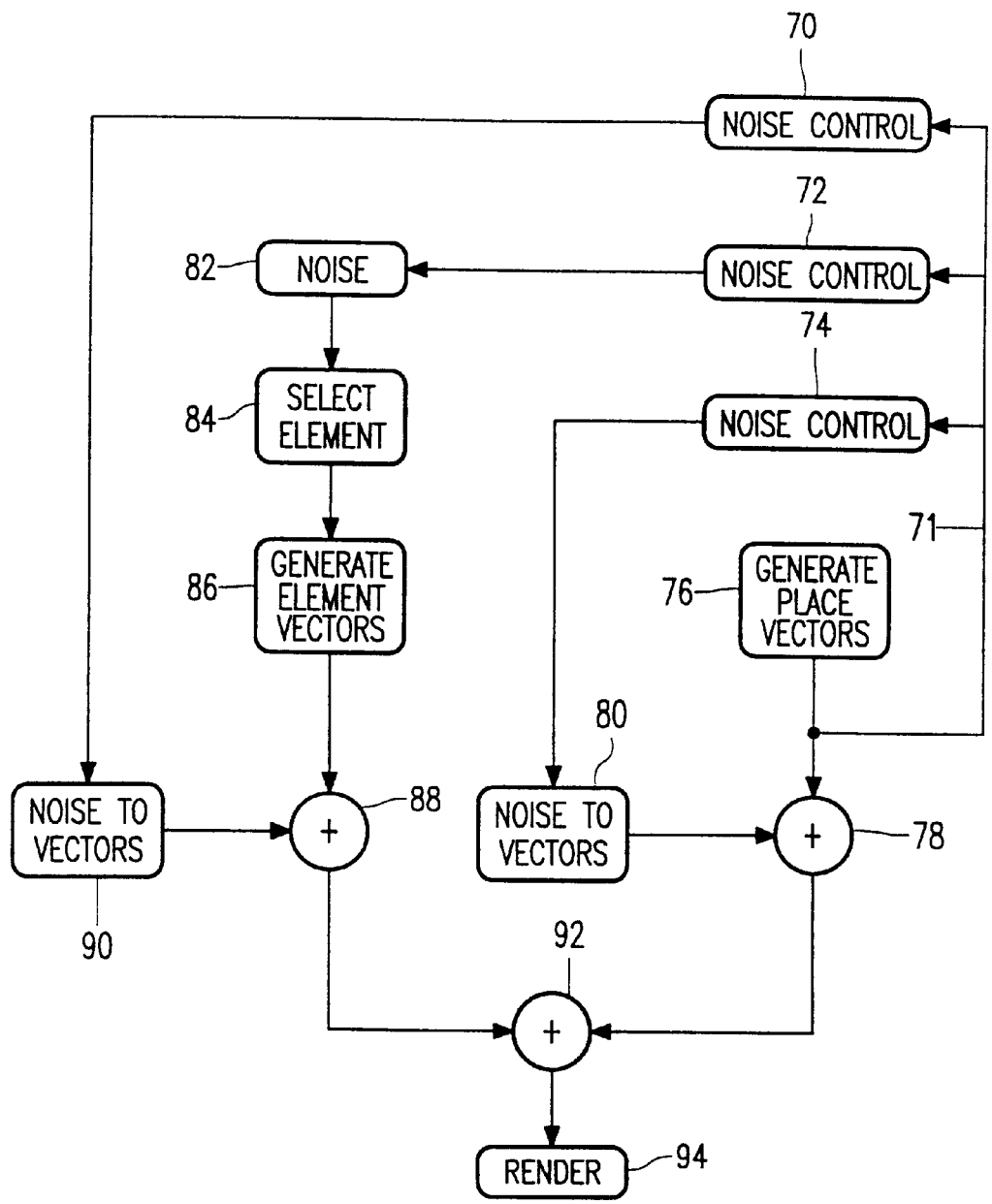
FIG. 2, a block diagram of the pattern formation.

FIG. 2 is a block diagram of the pattern formation, showing a preferred interaction between the various randomizing effects. First, blocks 70, 72, 74 represent the noise control; these may control actual parameters of the noise, such as the variance or range thereof, expressed in appropriate values. The noise control may be inputted externally by a designer, such as through defining a region wherein the non-uniformity should be effected, the locally applicable library of elementary shapes, the specifiers, and the like. As shown, these values may be controlled internally in a dynamic manner as symbolized through arrow 71 from the right. For effecting a deterministic non-uniformization, a similar setup can be used.

Block 84 selects the elementary shapes from a library. If the actual library contains only a single elementary shape, the effect of this block is notional only. Block 86 generates the vectors that represent the selected element. For example, a triangle is given by the three vectors defining the corners thereof. A sinusoidal curve may be given by a starting point, an amplitude vector, an orientation direction, and a parameter indicating the number of points on the curve that are mutually spaced in a predetermined manner, thereby generating a vector for each such point. Block 90 represents the noise that should influence the vectors, which noise is superposed on the elements of the vectors by way of addition in element 88. Other types of mixing various effects are feasible. The noise in question may be based on one of the various non-uniformizing actions described herein. In a refined organization, the noise may effectively be split in parts, which parts influence in a parallel manner the orientation of the elementary shapes, the scaling or size thereof, and the dilatation. The dilatation is defined herein as the angle between the two coordinate directions. The parameters of the elementary shape so influenced, then add up to an actual shape, which itself may be subject to further randomizing as presented by block 90.

Block 76 generates the position vectors, what may be called the geometrical ranking of the elementary shapes, and which again is expressable as one vector per elementary shape. The actual value of this vector through arrow 71 may influence the noise control as shown. In fact, the control may be expressed as a function of actual coordinate values. Block 80 represents the noise that should influence these vectors, which noise is superposed on these vectors by way of addition in element 78. The so randomized position of the elementary shapes gets the randomizing of the shape themselves through addition in element 92. The result thereof is used for rendering in block 94. Further, the actual location parameter of the elementary shape value before applying the location transformation specifier is retrocoupled to a control input for influencing non-uniformization of the shape transformation specifier.

Figure 3:
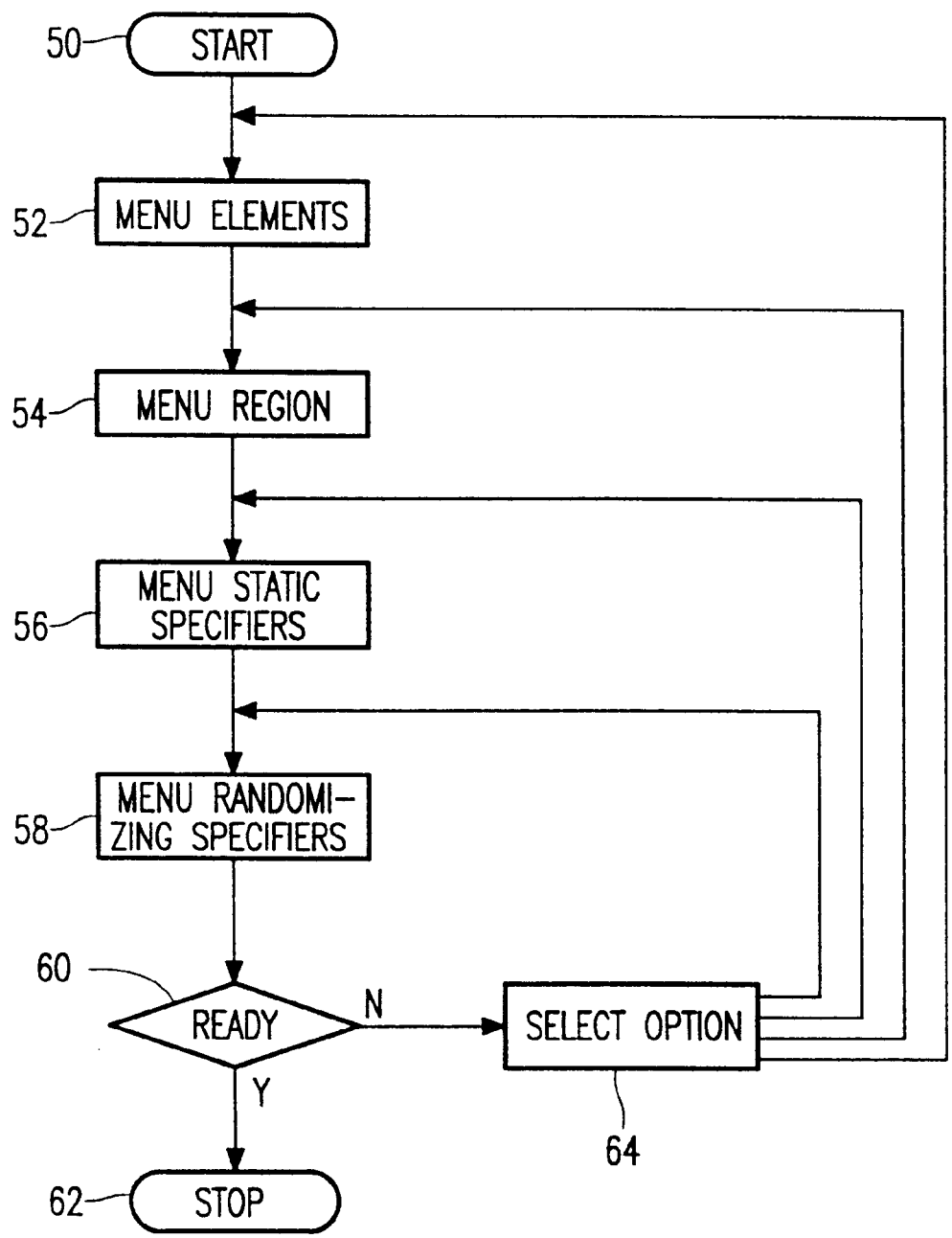
FIG. 3, a flow chart of the pattern formation.

FIG. 3 is an exemplary flow chart of the pattern formation, that is based in particular on blocks 22, 24, and 26 of FIG. 1; this Figure represents the presentation of the system to a user person. In block 50, the overall system is activated, and the required data processing facilities preempted. The next-following procedure is organized in the manner of successive menus, that may be presented in the form of dialogue windows. Dialogue windows per se are standard in data processing. Now first, block 52 is entered, wherein a choice is made amongst the various available elementary shapes. For particular embodiments thereof, see the various example patterns hereinafter. After a choice has been made, block 52 is left again. Next, block 54 is entered for therein specifying a region wherein the pattern must be realized. This region can be specified in absolute units such as millimeters, or rather in units that are relative to the size of an object or product that must receive the pattern. The region may in principle have an arbitrary shape, such as a rectangle, or be bounded through a line interconnecting a set of points. The surface may be two- or three-dimensional: the only difference therebetween is the manner in which the coordinate values are defined.

Next, block 56 is entered for therein specifying the values of various static transformation specifiers. These specifiers give the size, scale, dilatation, location, orientation, aspect ratio, and possibly other parameter values for the elementary shapes. Moreover, various ones of the transformation specifiers may have non-uniform values across the pattern; in particular, such non-uniform specifier may be a function of the location in the pattern. Next, block 58 is entered for therein specifying the randomization parameters or other non-uniformity of the transformation specifiers. A particular parameter can be randomized through assigning by means of a specifier quantity a probability distribution to that parameter value. A widely known example thereof is a Gaussian distribution with mean and variance parameters. A more elementary probability is the so-called square distribution that has a uniform probability for the parameter in question between the applicable limit values and probability zero elsewhere. Various other statistical distributions are well-known. Various different aspects of the pattern may be randomized by respectively associated types of statistics.

After a selection in block 58 has been made, the system asks (block 60) the user whether the requirements have been fulfilled. If yes, the process terminates, and the data so generated are outputted, while relinquishing the data processing facilities (62). If no in block 60, the system goes to block 64, wherein the user may select one of blocks 52–58. This allows to design a pattern in another part of the image considered. The set-up may be different, in that the various blocks have a different interrelationship; for example, the sequence among blocks 52–58 may be different.

Figure 4:
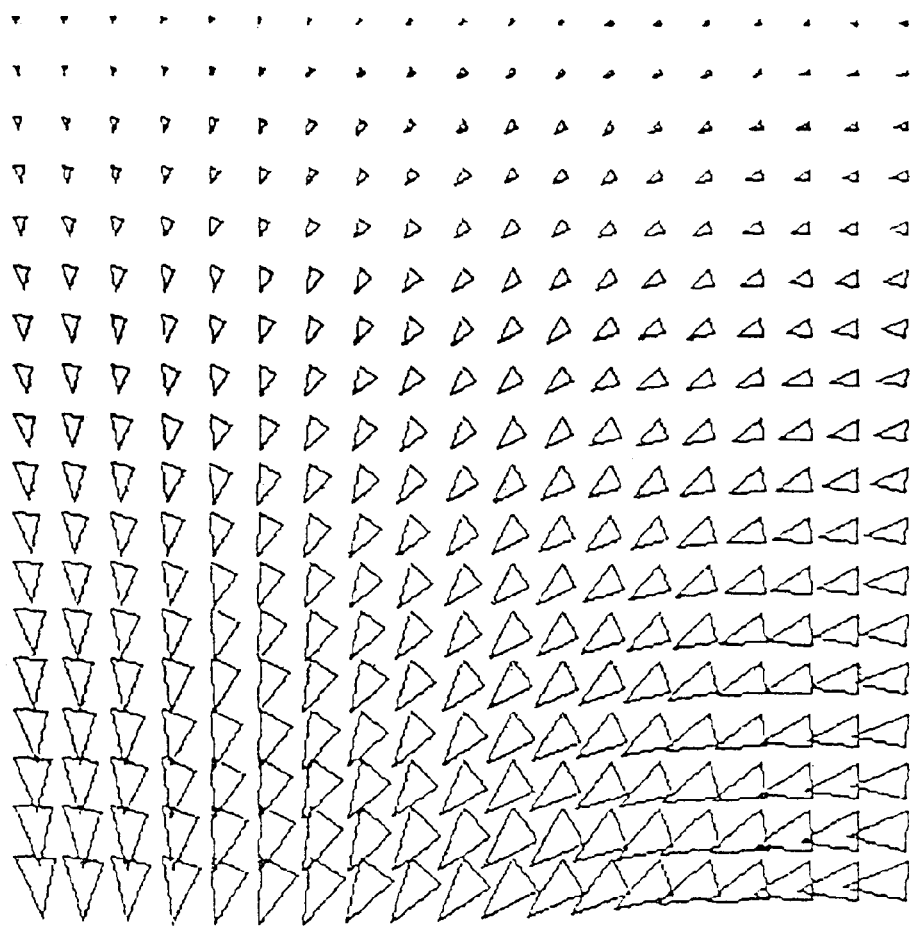
FIG. 4, a first pattern example.

FIG. 4 is a first example of a pattern generated according to the invention. The black/white pattern is based on a uniform structure of 18 rows and 19 columns of elementary triangles; the triangles themselves have three unequal angles. No randomizing has been introduced. The two non-uniform transformation specifiers are the sizes and the orientations of the individual triangles. First, from bottom to top the sizes decrease linearly in a manner that is uniform over the respective columns. Second, from left to right, the orientations change by 90 degrees in a clockwise direction, which again is uniform over the rows. It is to be seen first that the relative area actually covered by the triangles decreases from bottom to top. Secondly, an apparent directivity occurs in the lower part of the pattern which is vertical at left, horizontal at right, whilst some kind of curvature appears in the middle. In the upper part of the Figure, the effect is much less visible, if at all. The effects acquired by the non-uniform specifying can be used in various different ways, such as for varying surface appearance over a product, for providing a logo or other information to the surface, or for indicating particular surface parts. Note that the edges of the triangles have a somewhat staircase-like look, which is caused by the finite granularity of the image processing of the computer platform.

In addition to the two variations shown in FIG. 4, also the relative spacing or positioning of the elementary shapes may be non-uniform. Further, the selection among various different shapes may be non-uniform. The number of variable parameters may be three or more. The pattern may be applied to a flat surface, or to a three-dimensional surface. In the latter case, a coordinate system can be mapped on the surface, that provides the uniform substrate, on which the invention superposes its non-uniformity. It should be clear that the few examples described in the present embodiments represent only a limited part of the spectrum that can be realized with the invention.

Figure 5:
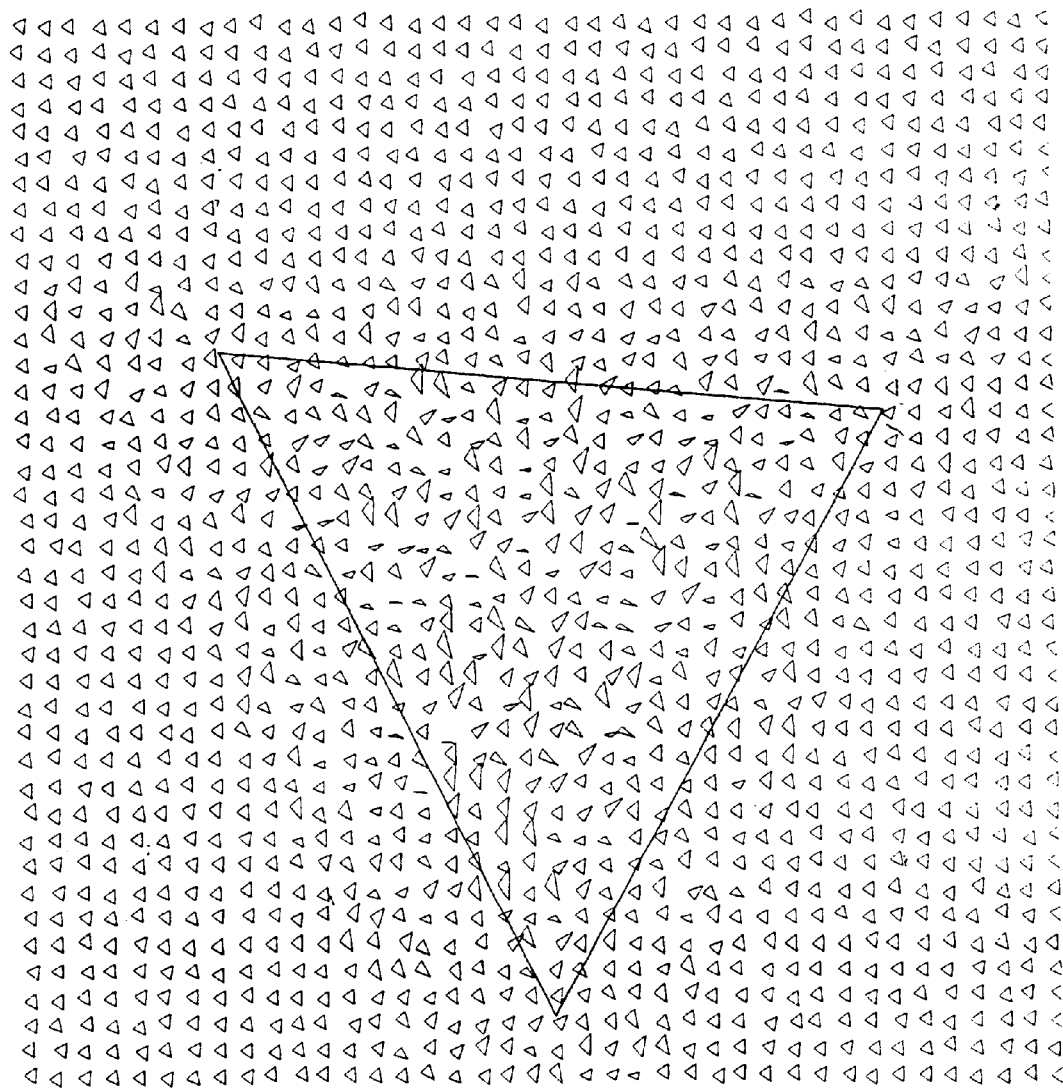
FIG. 5, a second pattern example.

FIG. 5 is a second example of a pattern generated according to the invention. Again, the black/white pattern is based on a uniform structure of rows and columns of elementary triangles that are nearly equilateral. First, the overall structure has a small amount of noise or randomization in the x and y position values of the various triangles. Second, in the central part of the Figure, with roughly the shape of an inverted and approximately equilateral triangle, as shown by its edges, an appreciable amount of noise occurs. Part of this noise influences the size of the small triangles as expressed in the square root of the inactual triangle area. Further, another part of this noise influences the orientation of the triangles, which can be expressed as the angle of the bisectrix through the left-most corner with the horizontal direction. Finally, a still further part of this noise influences the aspect ratio of the triangles which can be expressed as the largest ratio between two actual triangle sides. Another representation of the aspect ratio would be the triangle area divided by the largest edge. All randomizations were chosen according to a square distribution. For the size, the upper and lower bounds were about 0 and 2 times the standard size, respectively. For the aspect ratio, the upper and lower bounds were about 0 and 2. For the orientations, the upper and lower bounds were +/−180 degrees. As can be seen, also outside the triangle, a certain randomization has been effected, although to a lesser degree: obviously, the cut-off has not been immediate. In fact, a few spurious effects can be surmised, that detract only little from the overall picture. The inventor has experienced that randomizing should be used with care only.

Figure 6:
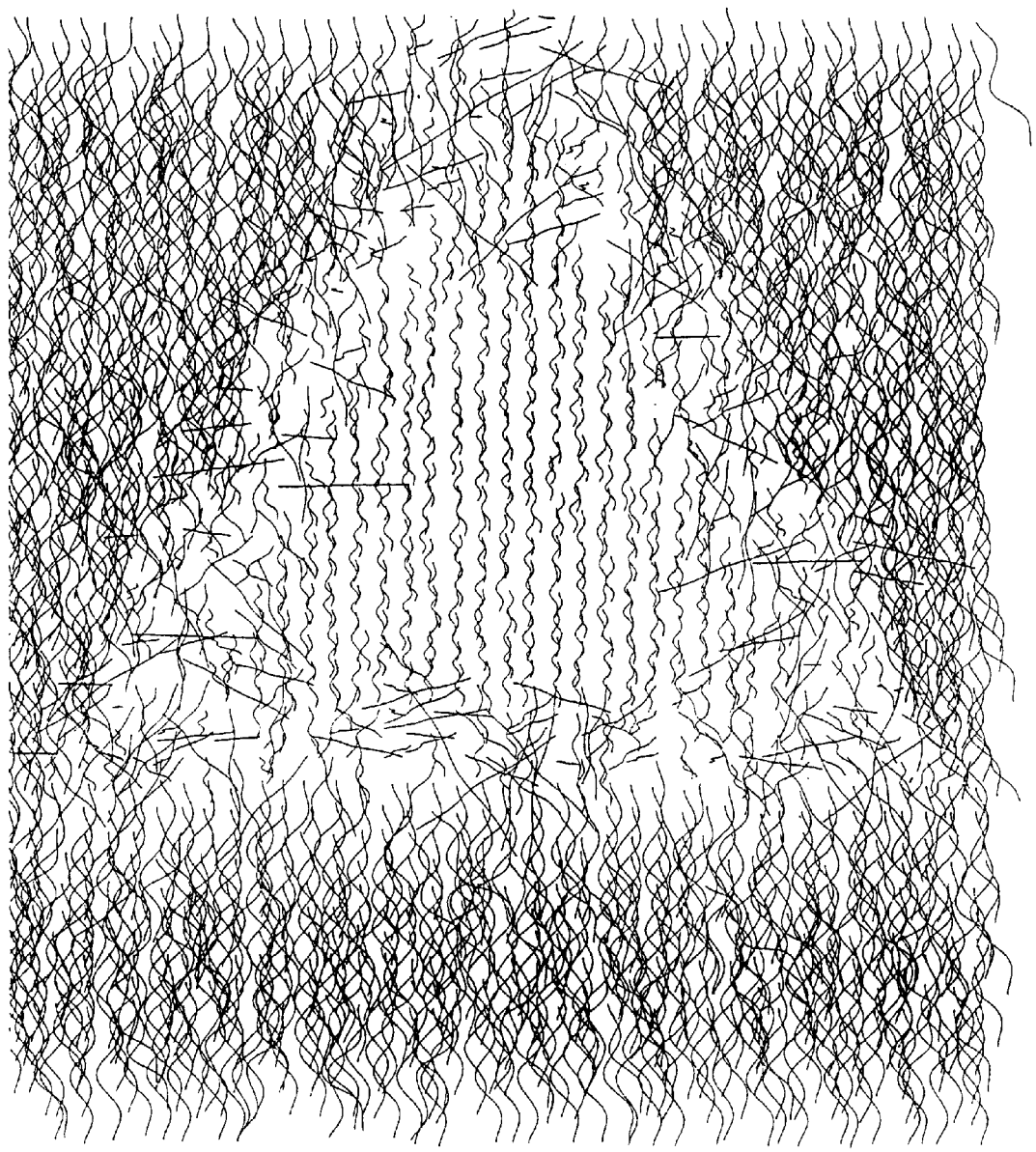
FIG. 6, a third pattern example.

FIG. 6 is a third example of a pattern generated according to the invention. Here, the basic elementary shape is a sinusoidal curve of which one specimen is visible at top right, with a length corresponding to about 1.5 periods. In the outer regions of the Figure, the amplitude of the curves is somewhat larger than their average spacing. The size and orientation of the curves are approximately uniform in this region. However, their spacing is highly randomized, so that the region looks like a great amount of tangled wire. In the middle region, which has the approximate shape of an equilateral triangle, the appearance of the pattern is quite different, in that the size of the elements has been reduced by about a factor of four, whilst they have been positioned with little randomization across the rows, but rather much randomization along the rows. In the intermediate region, roughly along the edges of the triangle, the character of the image is still different. Here, the orientation of the elemental shapes has been randomized completely. Together with some of the other randomizations that have not been removed fully at those positions, the lends that part of the image a still further fully different appearance.

Figure 7:
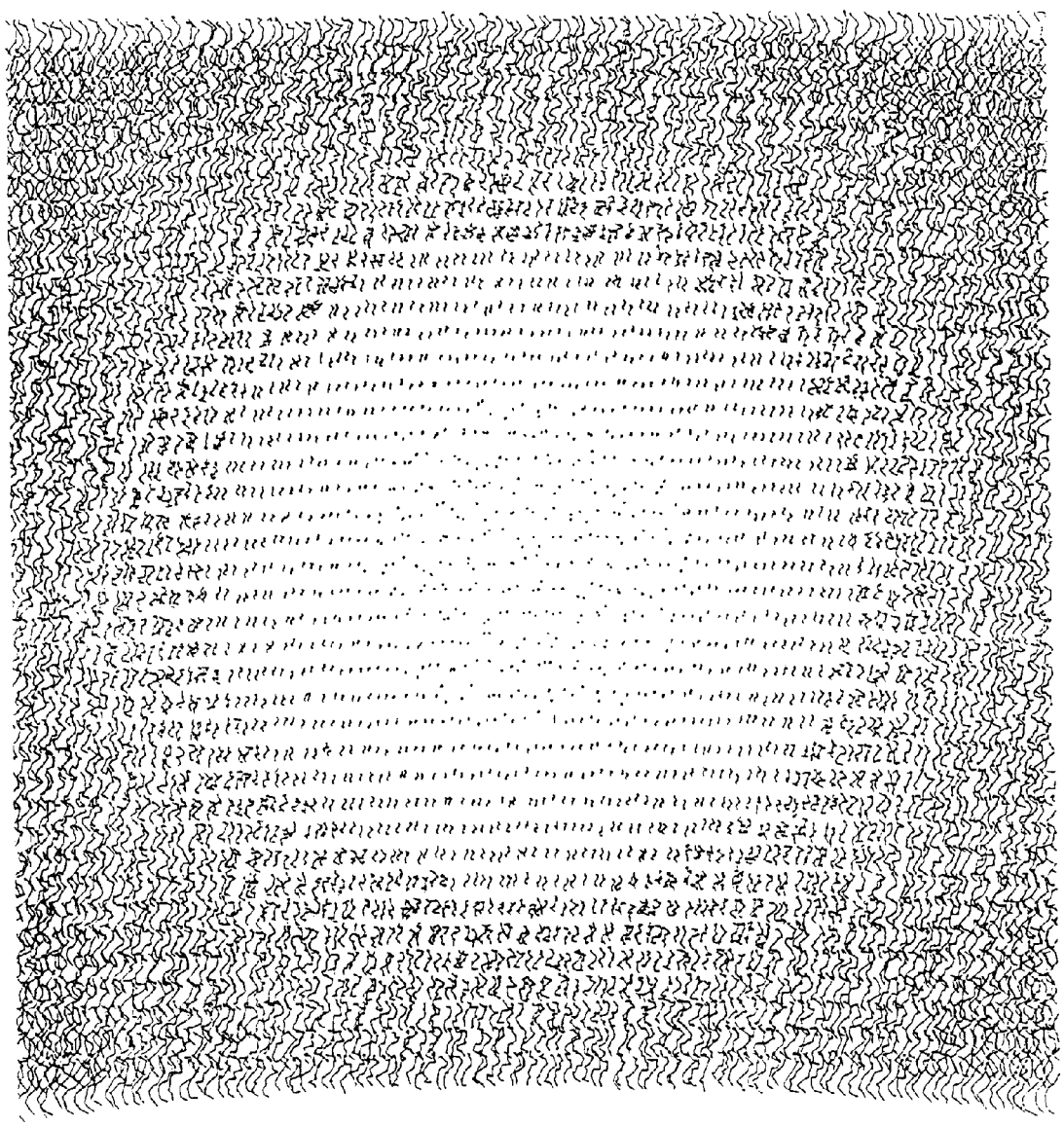
FIG. 7, a fourth pattern example.

FIG. 7 is a fourth example of a pattern generated according to the invention. This embodiment uses the same elemental shapes as FIG. 5. In the outer region, these have their shapes randomized to a high degree, also with spatial high frequency components. In consequence, they got a quite jagged appearance. Their positions have been set in a virtually uniform manner, however. In the central part of the Figure, however, which has the shape of a circle, the size of the elemental shapes decreases, just as the amount of randomization. Quite in the center, where the size of the elemental shapes has decreased to a mere point, their position are highly randomized. This lends the Figure a particular, sun-like image.

The above embodiments of non-uniformization, and in particular, randomization, of the pattern have been given by way of examples only; actual usage will vary as based on the materials used, the scale and usage of the product, and the purpose that the non-uniformization of the surface must serve. Various types of elementary shapes may be used.

What is claimed is:

1. A method for generating a granular graphic pattern on a physical surface, based on the multiple usage of elementary shapes, said method comprising through usage of computer graphics in a multilevel pattern generation, defining of at least two different transformation specifiers that are non-uniform among the elementary shapes with respect to either neighbouring shapes of said one elementary shapes and/or with respect to an overall geometry of said one of elementary shapes, and applying the elementary shapes so specified on the physical surface.

2. A method as claimed in claim 1, wherein a shape transformation specifier and a location transformation specifier are subjected in parallel to various non-uniformizations for subsequent aggregation of the latter specifier.

3. A method as claimed in claim 2, wherein an actual location parameter value of an elementary shape before applying the location transformation specifier is retro-coupled for controlling non-uniformization of the shape transformation specifier.

4. A method as claimed in claim 1, wherein at least a fraction of said non uniform specifiers are randomizing specifiers.

5. A method as claimed in claim 1, wherein said transformation specifiers include location and-or orientation of the elementary shapes.

6. A method as claimed in claim 1, furthermore featuring at least one transformation specifier with respect to at least one of a scale, a dilatation, and an aspect ratio of the elementary shapes.

7. A method as claimed in claim 1, furthermore featuring at least one randomizing specifier with respect to a basic geometry of the elementary shapes.

8. A method as claimed in claim 1, furthermore featuring at least one further randomizing specifier for selecting among a predetermined set of elementary shapes.

9. A machine for applying a granular graphic pattern on a physical surface, based on the multiple usage of elementary shapes, characterized in that the machine through usage of computer graphics means in a multilevel pattern generation, features defining means for defining at least two different transformation specifiers that are non-uniform among the elementary shapes with respect to either neighbouring elementary shapes of one of said elementary shapes and/or with respect to an overall geometry of said one of said elementary shapes, and applying means fed by the defining means for applying the elementary shapes so specified on a physical surface.

10. A product comprising a physical surface provided with a pattern generated according to a method as claimed in claim 1.

11. A method as claimed in claim 3, wherein at least a fraction of said non-uniform specifiers are randomizing specifiers.

12. A method as claimed in claim 5, wherein said relative transformation specifiers include location and-or orientation of the elementary shapes.

13. A method as claimed in claim 6, furthermore featuring at least one transformation specifier with respect to at least one of a scale, a dilatation, and an aspect ratio of the elementary shapes.

14. A method as claimed in claim 7, furthermore featuring at least one randomizing specifier with respect to a basic geometry of the elementary shapes.

15. A product comprising a physical surface provided with a pattern generated according to a method as claimed in claim 6.

16. A product comprising a physical surface provided with a pattern generated according to a method as claimed in claim 11.

17. A product comprising a physical surface provided with a pattern generated according to a method as claimed in claim 14.

* * * * *